United States Patent [19]

Roling

[11] Patent Number: 4,991,436
[45] Date of Patent: Feb. 12, 1991

[54] FUEL TANK GAUGE

[76] Inventor: Thomas N. Roling, 2311 N. Fifth St., Clinton, Iowa 52732

[21] Appl. No.: 456,933

[22] Filed: Dec. 26, 1989

[51] Int. Cl.⁵ ............................................. G01F 23/50
[52] U.S. Cl. ....................................... 73/320; 116/228
[58] Field of Search ................... 33/722; 73/319, 320, 73/321, 322, 305; 116/228, 110; 340/624

[56] References Cited

U.S. PATENT DOCUMENTS

| 1,141,500 | 6/1915 | Stahle | 73/317 |
| 1,272,436 | 7/1918 | Hastings | 73/320 |
| 1,509,304 | 9/1924 | MacLellan | 73/321 |
| 1,538,748 | 5/1925 | Rosenblad | 73/320 |
| 1,712,794 | 5/1929 | Jarvis | 73/322 |
| 1,751,016 | 3/1930 | O'Neill | 73/319 |
| 3,707,940 | 1/1973 | Sherrick et al. | 116/228 |
| 4,724,706 | 2/1988 | Stiever | 73/320 |

FOREIGN PATENT DOCUMENTS 397604  8/1933  United Kingdom ................. 73/322

Primary Examiner—Thomas B. Will

[57] ABSTRACT

A fuel tank gauge having a pivotal measuring portion that can accurately measure fuel level in a fuel tank of a vehicle not on level terrain and which also may be installed in the tank fill-pipe at an angle with the tank whereby the gauge pivot permits the measuring portion of the gauge to be in vertical position at all times.

2 Claims, 1 Drawing Sheet

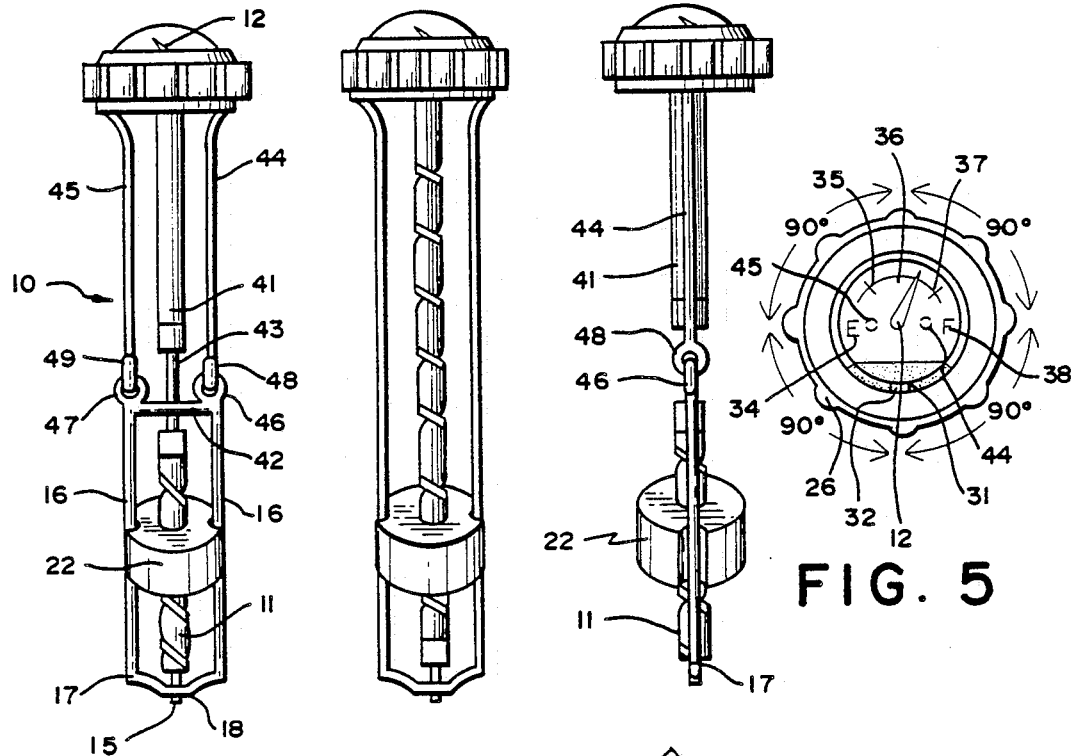
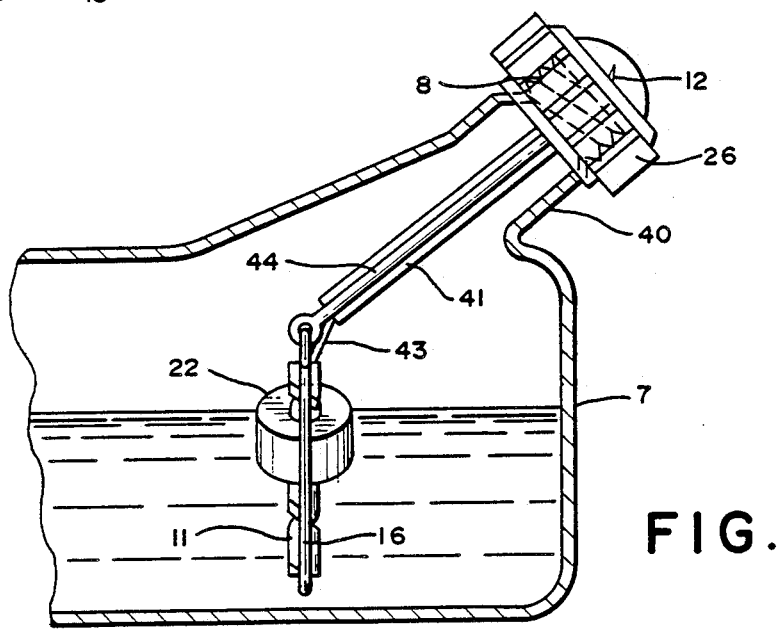

FUEL TANK GAUGE

BACKGROUND OF THE INVENTION

A. Field of the Invention

The purpose of this invention is to allow the owner to get a correct fuel reading. This can only be done when the float on the fuel tank gauge can operate vertically.

B. Description of the Art

The accuracy of the gauge is the sole purpose of this invention. This really does not make any difference if the fuel is a mixture or regular gasoline.

The need for such a device is paramount. Literally thousands of lawn tractors are made every year. Most of these lawn tractors have fuel tanks under the operator's seat. The tanks have a fill-pipe which is on an angle with the perpendicular. The improved fuel tank gauge will still operate under these conditions.

SUMMARY OF THE INVENTION

The need for more accurate measuring is the basis for this improved fuel tank gauge. The principle of buoyancy would not allow the gauge to work, unless the measuring portion of the gauge is in a perpendicular position. When the device is not in a perpendicular position the float will bind. The improved fuel tank gauge will give a correct reading. If the fuel tank is on an incline the hinged portion of the gauge always hangs in a position that the float will raise and lower.

BRIEF DESCRIPTION OF THE DRAWINGS

FIG. 1 is a sectional side view showing the gauge in its working position in the tank with an angular fill-pipe.

FIG. 2 shows a prior art device shown in U.S. Pat. No. 4,724,706.

FIG. 3 is a front view of the gauge in the present invention.

FIG. 4 is an end view of the gauge in a vertical position.

FIG. 5 is a plan view of the gauge dial and the location of the support rods.

DESCRIPTION OF THE PREFERRED EMBODYMENT

Referring now to FIG. 1, fuel tank 7 has an externally threaded top 8 and an angular fill-pipe 40. The gauge (generally 10) has a rotatable, vertical shaft 11 with a flexible rod 43 connected to shaft 41 which rotates a needle 12. Shaft 11 is a twisted piece of flat material. Shaft 11 is twisted in such a manner as to cause the needle 12 to rotate from empty to full in the depth of the tank. Shaft 11 is rotatably mounted in a U-shaped carriage/guide 16 which has formed in its bottom segment 17 a hole 18 into which a peg 15 (which is integral with shaft 11) extends.

Welded to the top of the carriage/guide 16 is a horizontal spreader/guide 42. On the top of the carriage/guide 16 eyelets 46 and 47 are formed, parallel to spreader/guide 42. Eyelet 46 and 47 are married to eyelets 48 and 49 and are perpendicular to spreader/guide 42.

Eyelets 48 and 49 are an integral part of connecting rods 44 and 45 respectively. Connecting rods 44 and 45 are molded into the cap 26 as shown in FIG. 3. These rods are molded 90 degrees from fuel level indicator markings 32 and 36.

The spreader/guide 42 has a hole centered from both directions. A flexible round connector rod 43 which is non-rotatably fastened to shaft 11 is guided through the hole in the spreader/guide 42. Flexible connector rod 43 is also non-rotatably connected to shaft 41. Shaft 41 is an integral part of needle 12.

The operation of float 22 follows the level of fuel in the tank. The float in turn will rotate shaft 11. Shaft 11 rotates flexible rod 43. Flexible rod 43 rotates shaft 41, thereby moving needle 12 to indicate the level of fuel in the tank. The needle 12 will travel from empty 34 to 35 ¼ tank, from 35 to 36 ½ tank, from 36 to 37 ¾ tank and from 37 to 38 full tank.

Eyelets 46, 47, 48, and 49 will allow the measuring section of the gauge to hinge. When the gauge is installed in the tank you will be looking at the dial indicating the fuel level. The measuring portion of the gauge will hang plumb or vertical.

The face of the dial will be orientated by means of a notch 31 so that loction mark 32 is at the lower end of the dial. Directly above mark 32 will be located mark 36 indicating ½ full.

Rods 44 and 45 in FIG. 3 are located 90 degrees from the half-full mark 36 respectively. This will correctly orient the face of the dial with the measuring portion of the gauge.

I claim:

1. A fuel tank gauge for accurately measuring fuel in a tank having a fill pipe through which said gauge is directed, said gauge including a gauge cap adapted to be attached to said fill-pipe, said gauge having a pair of support rods attached to said gauge cap and extending through said fill-pipe to the interior of said tank, said support rods having lower ends with a float guide freely pivotally connected thereto, said float guide having a rotatable vertical shaft with a spiral section having a vertically moveable float mounted on said spiral section, said float engageable with said float guide in a vertically moveable, non-rotational manner whereby vertical movement of said float causes said vertical shaft to rotate, and means on said filler-cap connected to said rotatable vertical shaft to indicate the rotational position of said shaft and thus the vertical position of said float.

2. The fuel tank gauge of claim 1 wherein said means on said filler cap comprises a needle associated with a gauge dial on said filler cap, said needle being connected to said rotational vertical shaft through a connecting rod connected directly to the needle and a flexible rod connected between the connecting rod and the rotational vertical shaft.

* * * * *